(12) United States Patent
Oetken

(10) Patent No.: US 9,856,612 B2
(45) Date of Patent: Jan. 2, 2018

(54) COMPACTION MEASUREMENT USING NEARBY SENSORS

(71) Applicant: Caterpillar Paving Products Inc., Brooklyn Park, MN (US)

(72) Inventor: Nicholas A. Oetken, Brooklyn Park, MN (US)

(73) Assignee: Caterpillar Paving Products Inc., Brooklyn Park, MN (US)

( * ) Notice: Subject to any disclaimer, the term of this patent is extended or adjusted under 35 U.S.C. 154(b) by 0 days.

(21) Appl. No.: 14/975,905

(22) Filed: Dec. 21, 2015

(65) Prior Publication Data

US 2017/0175346 A1 Jun. 22, 2017

(51) Int. Cl.
*E01C 19/28* (2006.01)
*G05D 1/02* (2006.01)

(52) U.S. Cl.
CPC .......... *E01C 19/288* (2013.01); *E01C 19/282* (2013.01); *G05D 1/0219* (2013.01); *G05D 2201/0202* (2013.01)

(58) Field of Classification Search
CPC .... E01C 19/288; E01C 19/282; G05D 1/0219
See application file for complete search history.

(56) References Cited

U.S. PATENT DOCUMENTS

| | | | |
|---|---|---|---|
| 5,942,679 A * | 8/1999 | Sandstrom | E01C 19/26 404/133.05 |
| 6,122,601 A * | 9/2000 | Swanson | A01B 79/005 702/137 |
| 6,575,034 B2 | 6/2003 | Seth et al. | |
| 7,873,492 B2 | 1/2011 | Ackermann | |
| 8,142,103 B2 | 3/2012 | Wolf | |
| 8,190,338 B2 | 5/2012 | Commuri | |
| 8,332,105 B2 | 12/2012 | Laux | |
| 2007/0239338 A1* | 10/2007 | Potts | E01C 19/288 701/50 |
| 2008/0063473 A1* | 3/2008 | Congdon | E01C 19/288 404/75 |
| 2009/0214300 A1 | 8/2009 | Birgisson et al. | |
| 2010/0087992 A1* | 4/2010 | Glee | E01C 19/288 701/50 |

(Continued)

FOREIGN PATENT DOCUMENTS

JP 2008138514 6/2008

OTHER PUBLICATIONS

Tom Kuennon, Down to the Dirt: Intelligent and new technologies are revolutionizing soil compaction, http://www.equipmentworld.com/down-to-the-dirt/, Accessed Jul. 30, 2015.

*Primary Examiner* — Abigail A Risic

(57) ABSTRACT

A compactor for compacting a jobsite having a plurality of work areas has a frame, a compacting element coupled to the frame, and a control system. The control system receives a plurality of vibration measurements from a plurality of vibration sensors located at a plurality of measuring locations, determines a plurality of vibration distances where the plurality of vibration distances represent a distance and a direction for each vibration sensor to the compactor, and determines a projected compaction state for each of the plurality of work areas based on the plurality of vibration measurements and the plurality of vibration distances.

15 Claims, 2 Drawing Sheets

(56) References Cited

U.S. PATENT DOCUMENTS

2010/0215434 A1\* 8/2010 Wolf .................... E01C 19/288
                                                         404/117
2014/0083195 A1   3/2014  Olschewski
2014/0348587 A1   11/2014 Corcoran et al.

\* cited by examiner

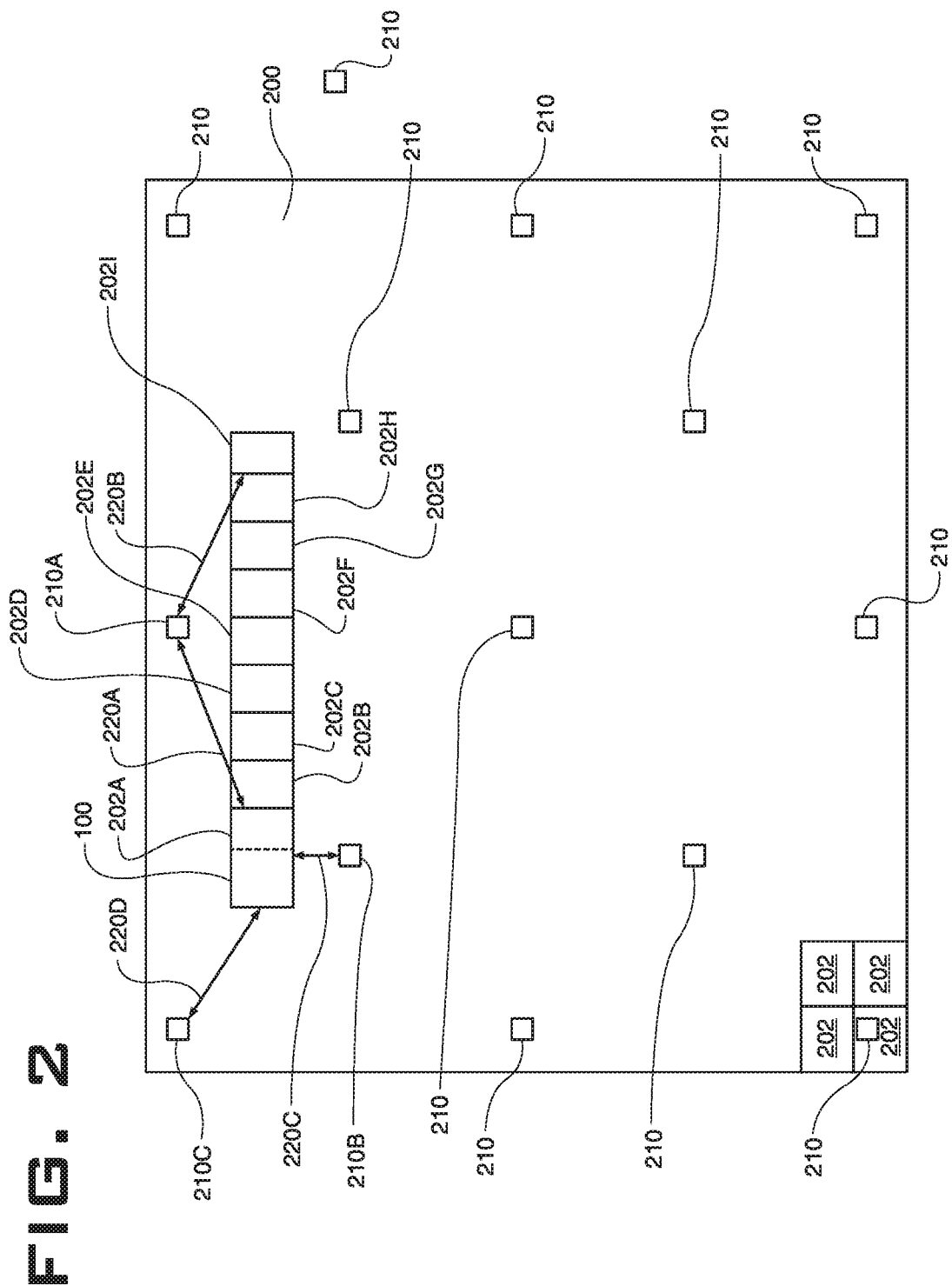

COMPACTION MEASUREMENT USING NEARBY SENSORS

TECHNICAL FIELD

The present disclosure relates generally to controlling the compaction process for a vibratory compactor. More particularly, the present disclosure relates to monitoring vibration measurements and compaction states to modify the compaction effort of a vibratory compactor.

BACKGROUND

Compactor machines, also variously called compaction machines, are frequently employed for compacting fresh laid asphalt, dirt, gravel, and other compactable materials associated with road surfaces. For example, during construction of roadways, highways, parking lots and the like, loose asphalt is deposited and spread over the surface to be paved. One or more compactors, which may be self-propelling machines, travel over the surface whereby the weight of the compactor compresses the asphalt to a solidified mass. The rigid, compacted asphalt has the strength to accommodate significant vehicular traffic and, in addition, provides a smooth, contoured surface that may facilitate traffic flow and direct rain and other precipitation from the road surface. Compactors are also utilized to compact soil or recently laid concrete at construction sites and on landscaping projects to produce a densified, rigid foundation on which other structures may be built.

One such type of compaction machine is a drum-type compactor having one or more drums adapted to compact particular material over which the compactor is being driven. In order to compact the material, the drum-type compactor, or vibratory compactor, includes a drum assembly having a variable vibratory mechanism that, for example, includes inner and outer eccentric weights arranged on a rotatable shaft situated within a cavity of the inner eccentric weight. Both amplitude and frequency of vibration (also referred to as compaction effort) are typically controlled to establish the degree of compaction. Amplitude is often controlled by a transversely moveable linear actuator adapted to axially bear against an axially translatable key shaft, causing the key shaft to rotate. The rotation of the key shaft in turn alters relative positions of the inner and the outer eccentric weights to vary amplitude of vibration created within the drum. Frequency of vibration is controlled by changing the speed of a drive motor positioned within the compactor drum. Compaction effort is modified by either modifying the amplitude, frequency, or amplitude and frequency.

The variable vibratory mechanism produces vibrations that affect both the jobsite on which the compactor is operating as well as in areas proximate to the jobsite. U.S. Pat. No. 8,332,105 describes a system using vibration measurement sensors to measure the vibration produced by the compactor and adjusting the variable vibratory mechanism to prevent damage when vibrations exceed a predetermined threshold. However, since the '105 patent is only concerned with adjusting the variable vibratory mechanism in response to exceeding a predetermined threshold, the system does not optimize the use of the compactor on the jobsite. The present disclosure is directed to one or more of the problems or issues set forth above.

SUMMARY OF THE DISCLOSURE

In one aspect, a compactor for compacting a jobsite with a plurality of work areas has a frame, a compacting element coupled to the frame, and a control system. The control system receives a plurality of vibration measurements from a plurality of vibration sensors located at a plurality of measuring locations, determines a plurality of vibration distances where each of the plurality of vibration distances represents a distance and a direction for each vibration sensor to the compactor, and determines a projected compaction state for each of the plurality of work areas based on the plurality of vibration measurements and the plurality of vibration distances.

In another aspect, a method of compacting a jobsite with a plurality of work areas includes applying a compaction effort to the plurality of work areas using a compactor, receiving at the compactor a plurality of vibration measurements from a plurality of vibration sensors located at a plurality of measuring locations, determining a plurality of vibration distances, and determining a projected compaction state for each of the plurality of work areas based on the plurality of vibration measurements and the plurality of vibration distances. Each of the plurality of vibration distances represents a distance and a direction for each of the plurality of vibration sensors to the compactor.

In yet another aspect, a compaction system for a jobsite with a plurality of work areas with a compactor operating on the jobsite. The compactor has a variable vibratory mechanism providing a compaction effort to the plurality of work areas. The compaction system also has a plurality of vibration sensors at a plurality of measuring locations and a control system in communication with the compactor and the plurality of vibration sensors. The control system receives a plurality of vibration measurements from the plurality of vibration sensors, determines a plurality of vibration distances where each of the plurality of vibration distances represents a distance and a direction for each vibration sensor to the compactor, and determines a projected compaction state for each of the plurality of work areas based on the plurality of vibration measurements and the plurality of vibration distances.

BRIEF DESCRIPTION OF THE DRAWINGS

FIG. 2 is a representation of a jobsite, according to an exemplary embodiment of the present disclosure.

DETAILED DESCRIPTION

Figure 1:
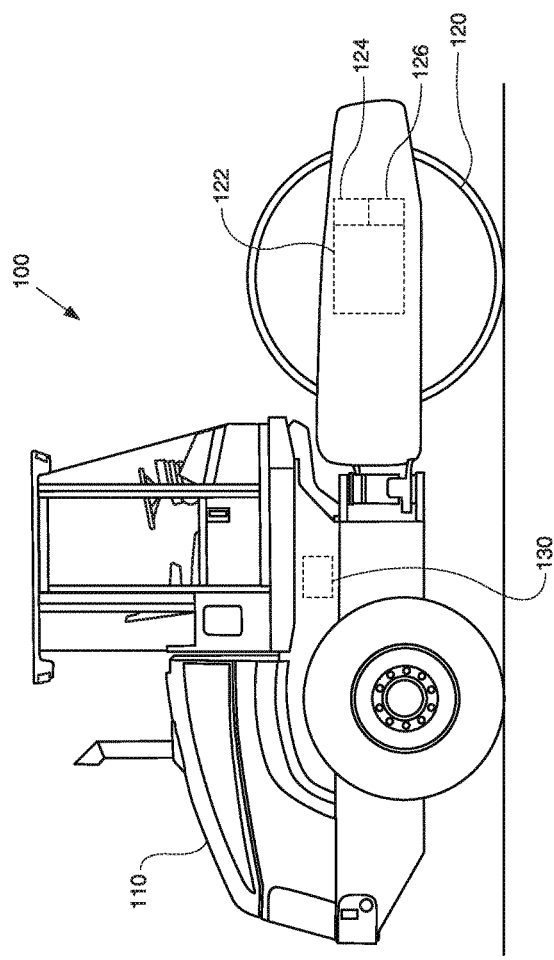
FIG. 1 is a side view of a compactor, according to an exemplary embodiment of the present disclosure.

This disclosure relates generally to a vibratory compactor machine having at least one roller drum in rolling contact with a surface to be compacted. A compactor is generally used in situations where loose surface material, characterized as material which can be further packed or densified, is disposed over the surface. As the compactor machine travels over the surface, vibrational forces generated by the compactor machine and imparted to the surface, acting in cooperation with the weight of the machine, compress the loose material to a state of greater compaction and density. The compactor machine may make one or more passes over the surface to provide a desired level of compaction. The material may be soil, gravel, sand, land fill trash, concrete, asphalt, or the like.

An exemplary embodiment of a compactor or compaction machine 100 is shown generally in FIG. 1. Compaction machine 100, which is shown as a vibratory soil compactor, may be any machine used to compact a surface material. Compaction machine 100 has a frame 110 and a compacting element 120 (or cylindrical drum 120). Compacting element 120 is rotatably coupled to frame 110 so that compacting element 120 rolls over the surface material as compaction machine 100 travels.

It will be appreciated that compacting element 120 can have a multitude of constructions. In particular, compacting element 120 is an elongated, hollow cylinder with a cylindrical drum shell that encloses an interior volume. The cylindrical roller drum extends along and defines a cylindrical drum axis. To withstand being in rolling contact with and compacting the surface material, the drum shell can be made from a thick, rigid material such as cast iron or steel. While the illustrated embodiment shows the surface of the drum shell as having a smooth cylindrical shape, in other embodiments, a plurality of bosses or pads may protrude from the surface of the drum shell to, for example, break up aggregations of the material being compacted.

Compacting element 120 has a variable vibratory mechanism 122. Variable vibratory mechanism 122 is disposed inside the interior volume of the roller drum. According to one exemplary embodiment, variable vibratory mechanism 122 includes one or more weights or masses disposed inside the roller drum at a position off-center from the axis line around which the roller drum rotates. As the roller drum rotates, the off-center or eccentric positions of the masses induce oscillatory or vibrational forces to the drum that are imparted to the surface being compacted. The weights are eccentrically positioned with respect to the common axis and are typically movable with respect to each other about the common axis to produce varying degrees of imbalance during rotation of the weights. The amplitude of the vibrations produced by such an arrangement of eccentric rotating weights may be varied by positioning the eccentric weights with respect to each other about their common axis to vary the average distribution of mass (i.e., the centroid) with respect to the axis of rotation of the weights. Vibration amplitude in such a system increases as the centroid moves away from the axis of rotation of the weights and decreases toward zero as the centroid moves toward the axis of rotation. Varying the rotational speed of the weights about their common axis may change the frequency of the vibrations produced by such an arrangement of rotating eccentric weights. In some applications, the eccentrically positioned masses are arranged to rotate inside the roller drum independently of the rotation of the drum. The present disclosure is not limited to these embodiments described above. According to other alternative embodiments, any variable vibratory mechanism 122 that modifies the compaction effort of the compacting element 120 may be used.

Variable vibratory mechanism 122 controls the compaction effort for compacting elements 120. By altering the distance of the eccentric weights from the axis of rotation in variable vibratory mechanism 122, the amplitude portion of the compaction effort is modified. By altering the speed of the eccentric weights around the axis of rotation in variable vibratory mechanism 130, the frequency portion of the compaction effort is modified. Additionally, both the amplitude portion and the frequency portion of the compaction effort of variable vibratory mechanism 130 can be modified by changing both the distance of the eccentric weights from the axis of rotation and the speed of rotation of the eccentric weights around the axis of rotation at the same time.

According to one exemplary embodiment, a compaction effort sensor 124 and a compaction state sensor 126 are located on the compacting element 120. In alternative embodiments, multiple compaction effort sensors 124 and compaction state sensors 126 may be located on compacting element 120. According to other alternative embodiments, compaction effort sensor 124 and compaction state sensor 126 need not be located on compacting element 120 but could be located on frame 110. Alternatively, compaction effort sensor 124 and compaction state sensor 126 could be located on both frame 110 compacting element 120. Compaction effort sensor 124 measures the compaction effort exerted on the surface being compacted. Compaction state sensor 126 measures the compactability of the surface material. The compactability of the surface material is based on the characteristics of the surface material being compacted along with the characteristics of the compacting element. So, for example, the compactability of the surface material sensed by compaction state sensor 126 will measure the characteristics of the surface material proximate to compacting element 120, such as type of material, material density, moisture content, compaction state of the material, etc. It is not necessary to measure all of the data parameters listed, these are listed for exemplary purposes. One of skill in the art will appreciate that there are numerous sensors or combination of sensors to accomplish this purpose, and any of them will suffice. It will also be appreciated by one of skill in the art that compaction effort sensor 124 and compaction state sensor 126 may be a single sensor.

The compaction effort sensed by compaction effort sensor 124 and the surface compactability sensed by compaction state sensor 126 for compacting element 120 is communicated through wired or wireless communication methods known in the art to a control system 130. Control system 130 utilizes the compaction effort and surface compactability measurements to adjust the compaction effort of compacting element 120. Control system 130 is coupled to compaction effort sensor 124 and compaction state sensor 126 either through wired or wireless communication methods known in the art. Control system 130 is also coupled to variable vibratory mechanisms 122 either through wired or wireless communication methods known in the art. Control system 130 calculates the desired compaction efforts and modifies the current compaction effort of variable vibratory mechanisms 122 in compacting element 120 to achieve the desired compaction efforts as described further herein.

A jobsite 200 is shown generally in FIG. 2. Jobsite 200 is broken into a plurality of work areas 202. Work areas 202 can be of any size, but are usually sized to allow accurate measurement of the compaction state of the entirety of the work area 202 and display of the compaction state of work areas 202 to the operator of compactor 100. A work area 202 sized too large would have multiple compaction states. A work area 202 too small would complicate compaction of the jobsite 200 since the operator would not be able to control the compaction state of a specific work area 202 without affecting surrounding work areas 202. In an exemplary embodiment, each work area 202 would be an area ⅓ meter by ⅓ meter. A limited number of work areas 202 are shown in FIG. 2 for the sake of keeping the illustration clear. In practice, all of jobsite 200 would be broken into work areas 202. Work areas 202 would be displayed to operator of compaction 100 as a map, indicating what work areas 202 are at the desired compaction state and which work areas 202 continue to need compaction effort applied to reach the desired compaction state.

Vibration sensors 210 are located at known measuring locations on and off of jobsite 200. Vibration sensors 210 may either measure the vibration level of the ground at a specific point or the speed of vibration through the ground. Vibration sensors 210 may be provided at locations where there is concern about vibratory forces from the compactor causing damage to a structure. Such locations may include buildings, roads, tunnels, sewers, pipelines, utility conduits, or bridges, among many other structures. Vibration sensors 210 would be placed in locations off of jobsite 200 when those locations are close enough to jobsite 200 that there would be concern about damage from the vibratory forces. Vibration sensors 210 may also be positioned on or around jobsite 200 to determine the compaction state of work areas 202, as will be described in more detail. The more vibration sensors 210 located on or around jobsite 200 allows more accurate mapping of the compaction state of jobsite 200.

Compactor 100 operates on jobsite 200 to provide compaction effort to each work area 202 to achieve the desired compaction state for each work area 202. As illustrated in FIG. 2, compactor 100 moves from work areas 202A to work area 202I. Compactor 100 is illustrated as over work area 202A, but is larger than work area 202A. During that movement, compactor 100 provides compaction effort to work areas 202A, 202B, 202C, 202D, 202E, 202F, 202G, 202H, and 202I. Additionally, during that movement, compactor 100 receives vibration measurements from vibration sensors 210 located on or around the jobsite 200. These vibration measurements are transmitted wirelessly to control system 130 and are used to adjust the compaction effort of compactor 100 by adjusting the variable vibratory mechanism 122.

Compactor 100 also receives positional information on its distance from each of the vibration sensors 210. For example, as compactor 100 moves from work area 202A to 202I, control system 130 receives locational information from vibration sensor 210A. At work area 202A, compactor 100 is at a distance and direction 220A from vibration sensor 210A. At work area 202I, compactor 100 is at a distance and direction 220B from vibration sensor 210A. Accordingly, control system 130 knows the distance and direction to vibration sensor 210A at all times.

Control system 130 knows the positional data from all vibration sensors on jobsite 200. When compactor 100 is at work area 202A, for example, it receives positional information from vibration sensor 210A, 210B, and 210C. Therefore, control system 130 knows the distance and directions 220A, 220C, and 220D of compactor 100 from vibration sensors 210A, 210B, and 210C. For clarity, control system 130 knows the distance and direction of compactor 100 in work area 202A from all vibration sensors 210 located on or around jobsite 200, but only distance and directions 220A, 220C, and 220D are illustrated in FIG. 2.

While control system 130 is shown as being located on compactor 100, in alternative embodiments, control system 130 could be located anywhere on or off a jobsite 200, so long as it is in communication with the compactor 100, variable vibratory mechanism 122, compaction effort sensor 124, compaction state sensor 126, and vibration sensors 210. Control system 130 is also in communication with additional compactors 100 (and the variable vibratory mechanism 122, compaction effort sensor 124, and compaction state sensor 126 of additional compactors 100). Control system 130 may also be in communication with the supervisor of jobsite 100 or the operator of compactors 100.

INDUSTRIAL APPLICABILITY

The present disclosure finds potential application in, among other potential applications, any compaction machine 100 that has a compacting element 120 that includes variable vibratory mechanism 122. In particular, the present disclosure assists in accurately mapping the compaction state of each work area 202. The present disclosure also assists in preventing damage to structures located on or around jobsite 200 by the vibratory forces employed by compactor 100 on jobsite 200.

By knowing the vibration measurement, distance, and direction of compactor 100 from each vibration sensor 210, control system 130 can accurately map the compaction state of each work area 202. As the vibration caused by compactor 100 moves from the compactor 100 to the vibration sensor 210, the vibration will be changed by the compaction state of the ground it travels through. Vibration signals will be more dampened by softer work areas 202 than by harder work areas 202. Knowing the distance and direction of the vibration measurement and how the vibration signal was impacted by the soil of the work areas 202 that the signal traveled through, control system 130 produces a map showing the compaction state of the work areas 202. The map allows the operator of compactor 100 to move to a work area 202 that needs further compaction and provide the proper compaction effort to achieve the desired compaction state of that work area 202. In an advanced system, the control system 130 may automatically move compactor 100 around jobsite 200 and alter the compaction effort of variable vibratory mechanism 122 to achieve the desired compaction state of each work area 202 on the jobsite. More vibration sensors 210 provide a more detailed and accurate map for the operator of compactor 100 or the supervisor of jobsite 200. In further embodiments, multiple compactors 100 may operate on jobsite 200 and would all be in communication with each other to know the compaction state of all the work areas 202 on jobsite 200.

This system may also be used to proactively prevent damage to structures on or around jobsite 200 from the vibratory forces exerted by compactor 100. As an example, compactor 100 at work area 202A exerts a first compaction effort on work area 202A. The goal is to modify the first compaction effort to a second compaction effort proactively so that compaction effort exerted by compactor 100 at new work area 202I does not result in an excessive vibration that would cause damage to a structure at a measuring location. At work area 202A, compactor 100 (through control system 130) receives the vibration measurement from vibration sensor 210A, as well as the distance 220A. At work area 202A, control system 130 also knows the compaction state of work area 202A through compaction state sensor 126. Control system 130 also knows the compaction state of work area 202I through the compaction state map of jobsite 100. This compaction state could be based on the projected, corrected, or actual compaction state of each work area 202. With compaction state sensor 126, compactor 100 records the compaction state of each work area 202 and logs that. If multiple compactors 100 are operating on jobsite 200, all compactors 100 will communicate with each other as to the compaction state of each work area 202. As a result, each compactor 100 knows the compaction state of each work area 202. Control system 130 also uses distance 220B when compactor 100 is at work area 202I in the calculation. Therefore, knowing the compaction state of work area 202A, the compaction state of work area 202I, the vibration measurement when compactor 100 is at work area 202A, the distance 220A, and the distance 220B, control system 130 can determine what the compaction effort should be at work area 202I, and proactively adjust the compaction effort to the desired compaction effort to prevent exceeding a predetermined vibration threshold.

The vibration measurement when compactor 100 is in work area 202A is based on distance 220A, plus the compaction state of work areas 202 through which the vibration signal traveled. Control system 130 also knows the distance 220B, plus the compaction state of work areas 202 through which the vibration signal will travel when compactor 100 is in work area 202I. Accordingly, control system 130 knows whether the compaction effort at work area 202I needs to remain the same, be increased, or lowered to achieve the desired compaction state for 202I while also maintaining the vibration measurement below a predetermined threshold to prevent damage to structures at a measuring location where vibration sensor 210 is located.

In other embodiments, control system 130 may create a target route for compactor 100 through a subset of work areas 202. For example, FIG. 2 shows compactor 100 moving across work areas 202A to 202B to 202C to 202D to 202E to 202F to 202G to 202H to 202I. The target route is determined by control system 130 to allow optimal use of the compactor by minimizing the number of passes required to achieve the desired compaction state of each work area 202. Each one of these work areas 202 may have a different compaction state and may require a different compaction effort. Control system 130 uses the compaction state of each work area 202 to determine the compaction effort for each work area 202.

In exemplary embodiments, the map created of jobsite 200 showing the compaction state of each work area 202 using vibration sensors 210 provides the projected compaction state of each work area 202. The projected compaction state of each work area 202 may be different than the actual compaction state of each work area 202 as measured by compaction state sensor 226. Control system 130 may compare the projected compaction state of a specific work area 202 to the actual compaction state of each work area 202, and then adjust the map to display a corrected compaction state of each work area 202 that does not have an actual compaction state measurement from compaction state sensor 226. This way, control system 130 calibrates the information to provide the most accurate model to the operator of compactor 100 and the supervisor of jobsite 200. The map visually provides the operator of compactor 100 and the supervisor of jobsite 200 with the compaction state of each work area. This could be by either providing the operator of compactor 100 and the supervisor of jobsite 200 with numerical values for each work area 202, color codes for each work area 202, or other methods known in the art.

This provides a greater amount of accuracy than simply adjusting compaction effort upon reaching the predetermined threshold for the vibration signal. By the point the predetermined threshold is reached, an adjustment in compaction effort may be too late and structural damage could be done. Instead, the system of the present disclosure proactively determines what the vibration measurement will be at the work area 202 the compactor 100 is moving towards, and proactively adjusts the compaction effort lower to avoid reaching the predetermined threshold.

It should be understood that the above description is intended for illustrative purposes only, and is not intended to limit the scope of the present disclosure in any way. Thus, those skilled in the art will appreciate that other aspects of the disclosure can be obtained from a study of the drawing, the disclosure, and the appended claims.

What is claimed is:

1. A compactor for compacting a jobsite having a plurality of work areas comprising:
   a frame;
   a compacting element, wherein the compacting element is coupled to the frame and includes a compaction state sensor configured to measure compaction state values of the work area on which the compactor is located; and
   a control system configured to:
      receive a plurality of vibration measurements from a plurality of vibration sensors located at a plurality of measuring locations;
      determine a plurality of vibration values from the vibration measurements, each of the plurality of vibration values representing a distance and a direction for each of the plurality of vibration sensors to the compactor; and
      generate a compaction state map including each of the plurality of work areas, the compaction state map being based on the plurality of vibration values and the compaction state values.

2. The compactor of claim 1, further comprising:
   a variable vibratory mechanism coupled to the compacting element to provide a variable compaction effort to the work area on which the compactor is located.

3. The compactor of claim 2, wherein the control system is further configured to:
   determine a target compaction effort for each of the plurality of work areas based on the compaction state map.

4. The compactor of claim 1, wherein the control system is further configured to:
   compare an actual compaction state of the work area on which the compactor is located to a projected compaction state of the work area on which the compactor is located.

5. The compactor of claim 4, wherein the
   compaction state map is based on the projected compaction state and the actual compaction state.

6. A method of compacting a jobsite having a plurality of work areas comprising:
   applying a compaction effort to the plurality of work areas using a compactor;
   receiving an actual compaction state of the work area on which the compactor is located via a compaction state sensor positioned on the compactor;
   receiving at the compactor a plurality of vibration measurements from a plurality of vibration sensors located at a plurality of measuring locations;
   determining a plurality of vibration values from the vibration measurements, each of the plurality of vibration values representing a distance and a direction for each of the plurality of vibration sensors to the compactor; and
   generating a compaction state map including each of the plurality of work areas, the compaction state map being based on the plurality of vibration values and the actual compaction state of the work area on which the compactor is located.

7. The method of claim 6, wherein the compaction effort is a variable compaction effort provided by a variable vibratory mechanism.

8. The method of claim 7, further comprising:
   determining a target compaction effort for each of the plurality of work areas based on the compaction state map; and
   adjusting the compaction effort for each of the plurality of work areas to the target compaction effort for that particular work area.

9. The method of claim 8, further comprising:
   applying a second variable compaction effort to the plurality of work areas using a second compactor having a second variable vibratory mechanism.

10. The method of claim 9, further comprising:
receiving at the second compactor a plurality of secondary vibration measurements from the plurality of vibration sensors;
determining a plurality of second vibration values from the vibration measurements, each of the plurality of second vibration values representing a second distance and a second direction for each of the plurality of vibration sensors to the second compactor; and
wherein the generating of the compaction state map is also based on the plurality of second vibration values.

11. A compaction system for a jobsite having a plurality of work areas comprising:
a first compactor operating on the jobsite, the first compactor having a variable vibratory mechanism providing a first compaction effort to the plurality of work areas;
a second compactor operating on the jobsite, the second compactor having a variable second vibratory mechanism providing a second compaction effort to the plurality of work areas;
a plurality of vibration sensors at a plurality of measuring locations; and
a control system in communication with the first compactor, the second compactor, and the plurality of vibration sensors and configured to:
receive a plurality of first vibration measurements from the plurality of vibration sensors and receive a plurality of second vibration measurements from the plurality of vibration sensors;
determine a plurality of first vibration values and a plurality of second vibration values based on the first vibration measurements and the second vibration measurements, each of the plurality of first vibration values representing a first distance and a first direction for each of the plurality of vibration sensors to the first compactor, and each of the plurality of second vibration values representing a second distance and a second direction for each of the plurality of vibration sensors to the second compactor; and
determine a projected compaction state for each of the plurality of work areas based on the plurality of first vibration values and the plurality of second vibration values.

12. The compaction system of claim 11, wherein the control system is further configured to:
determine a target compaction effort for each of the plurality of work areas based on the projected compaction state; and
adjust the first compaction effort for each of the plurality of work areas to the target compaction effort for that particular work area.

13. The compaction system of claim 12, wherein the control system is further configured to:
adjust the second compaction effort for each of the plurality of work areas to the target compaction effort for that particular work area.

14. The compaction system of claim 12, wherein the control system is further configured to:
generate a target route for at least one of the first compactor or the second compactor across a subset of the plurality of work areas.

15. The compaction system of claim 13, wherein the control system is further configured to:
generate a first target route for the first compactor across a subset of the plurality of work areas; and
generate a second target route for the second compactor across a second subset of the plurality of work areas.

* * * * *